(12) United States Patent
Cho et al.

(10) Patent No.: US 10,740,444 B2
(45) Date of Patent: Aug. 11, 2020

(54) ELECTRONIC DEVICE AND METHOD FOR PERFORMING AUTHENTICATION

(71) Applicant: Samsung Electronics Co., Ltd., Gyeonggi-do (KR)

(72) Inventors: Hyun-Chul Cho, Gyeonggi-do (KR); Seung-Hoe Gu, Daejeon (KR); Hyun-Ju Park, Gyeonggi-do (KR); Hyun-Soo Shim, Seoul (KR); Soon-Young Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 260 days.

(21) Appl. No.: 15/884,599

(22) Filed: Jan. 31, 2018

(65) Prior Publication Data

US 2018/0218135 A1 Aug. 2, 2018

(30) Foreign Application Priority Data

Feb. 1, 2017 (KR) ........................ 10-2017-0014580

(51) Int. Cl.
| | |
|---|---|
| *G06F 21/31* | (2013.01) |
| *G06Q 20/32* | (2012.01) |
| *G06Q 20/40* | (2012.01) |
| *G06F 21/35* | (2013.01) |
| *G06F 3/147* | (2006.01) |
| *H04B 5/00* | (2006.01) |

(52) U.S. Cl.
CPC .............. *G06F 21/31* (2013.01); *G06F 21/35* (2013.01); *G06Q 20/3278* (2013.01); *G06Q 20/40* (2013.01); *G06Q 20/4014* (2013.01); *G06F 3/147* (2013.01); *H04B 5/0031* (2013.01)

(58) Field of Classification Search
CPC .......... G06F 21/31; G06F 21/34; G06F 21/35; G06Q 20/3278; G06Q 20/40; G06Q 20/4014
See application file for complete search history.

(56) References Cited

U.S. PATENT DOCUMENTS

| | | | |
|---|---|---|---|
| 9,038,894 B2 | 5/2015 | Khalid | |
| 9,092,600 B2* | 7/2015 | Scavezze | ................ G06F 21/31 |
| 10,191,555 B2* | 1/2019 | Fujimaki | ............ G02B 27/0172 |
| 2014/0071041 A1* | 3/2014 | Fujimaki | ............ G02B 27/0172 345/156 |

(Continued)

*Primary Examiner* — Khang Do
(74) *Attorney, Agent, or Firm* — Cha & Reiter, LLC.

(57) ABSTRACT

Disclosed is an electronic device and a method for processing authentication. The electronic device includes a communication circuit; a display; a memory; and at least one processor electrically connected to the communication circuit, the display, and the memory, wherein the memory stores instructions that cause the at least one processor to identify whether the electronic device is mounted on a first external electronic device, execute at least one application for an authentication based at least part of the identification, detect a second external electronic device, which can transmit authentication information related to the authentication, receive at least one piece of information related to the authentication from the second external electronic device based at least partially on the detection outcome, and perform authentication based on the received authentication information.

18 Claims, 8 Drawing Sheets

(56) References Cited

U.S. PATENT DOCUMENTS

| | | | |
|---|---|---|---|
| 2015/0007300 A1* | 1/2015 | Kim | G06F 21/33 |
| | | | 726/9 |
| 2015/0074418 A1* | 3/2015 | Lee | G06F 21/45 |
| | | | 713/186 |
| 2015/0138645 A1* | 5/2015 | Yoo | G02B 27/0101 |
| | | | 359/630 |
| 2015/0186984 A1* | 7/2015 | Loganathan | G06Q 30/0641 |
| | | | 705/27.1 |
| 2016/0063474 A1 | 3/2016 | Spencer, II | |
| 2016/0070121 A1 | 3/2016 | Sales et al. | |
| 2016/0140773 A1* | 5/2016 | Yajima | G02B 27/017 |
| | | | 345/633 |
| 2016/0247324 A1* | 8/2016 | Mullins | G06F 3/012 |
| 2016/0342782 A1* | 11/2016 | Mullins | G06F 21/32 |
| 2017/0094156 A1* | 3/2017 | Kim | G06F 3/013 |
| 2017/0150227 A1* | 5/2017 | Kim | H04N 21/4126 |
| 2018/0365477 A1* | 12/2018 | Seol | G06F 3/0486 |
| 2019/0028579 A1* | 1/2019 | Cho | H04M 1/0214 |

\* cited by examiner

ELECTRONIC DEVICE AND METHOD FOR PERFORMING AUTHENTICATION

CLAIM OF PRIORITY

This application claims priority under 35 U.S.C. § 119(a) to Korean Patent Application Serial No. 10-2017-0014580, which was filed in the Korean Intellectual Property Office on Feb. 1, 2017, the entire content of which is hereby incorporated by reference.

TECHNICAL FIELD

The present disclosure relates to an electronic device, and more particularly, to an electronic device and a method for improving authentication process.

BACKGROUND

Recently, a variety of services and additional new features provided by electronic devices has rapidly increased. In order to enhance the enjoyment of electronic devices, service providers and device manufacturers are competitively developing useful functions to meet various demands of users so as to differentiate from their competitors.

Today, electronic devices being incorporated into a wearable device that is worn on the body. The electronic devices that can be worn on bodies may include, for example, a head-mounted electronic device, such as a Head-Mounted Display (HMD).

A head-mounted display device may be worn on a user's body part (for example, the user's head) to simulate a virtual-reality environment or an augmented-reality environment to the user. To this end, a display screen is provided with user interfaces to enable computer-generated environment that let you experience a different reality.

SUMMARY

A user may mount an electronic device to one's head using a virtual reality type headset, which is strapped firmly on the head. In operation, the electronic device mounted on the headset can perform an operation of authenticating the user, when the user wishes to join an Internet site, logging in to an Internet site, or performing payment through the electronic device. Normally, in a non-virtual-reality environment, the user inputs user information through a virtual keyboard or biometric information including a fingerprint or an iris for authentication. However, when authentication is performed in the state in which the electronic device is mounted on an external electronic device, such as the head set, authentication using biometric information (for example, the fingerprint or iris) cannot be used. Instead, the user has to perform authentication using a virtual keyboard which in turn cause many inconvenience to the user.

Various embodiments of the present disclosure may provide a method of performing authentication through a second external electronic device when an electronic device is mounted on the first external electronic device such as a headset.

In accordance with an aspect of the present disclosure, an electronic device includes: a communication circuit; a display; a memory; and at least one processor electrically connected to the communication circuit, the display, and the memory, wherein the memory stores instructions that cause the at least one processor to identify whether the electronic device is mounted on a first external electronic device, execute at least one application for an authentication based at least part of the identification, detect a second external electronic device, which can transmit authentication information related to the authentication, receive at least one piece of information related to the authentication from the second external electronic device based at least partially on the detection outcome, and perform the authentication based on the received authentication information.

In accordance with another aspect of the present disclosure, a method of performing authentication by an electronic device including a communication circuit, a display, a memory, and a processor includes: identifying whether the electronic device is mounted on a first external electronic device; executing at least one application for an authentication based at least part of the identification; detecting a second external electronic device, which can transmit authentication information related to the authentication; receiving at least one piece of information related to the authentication from the second external electronic device based at least partially on the detection outcome; and performing the authentication based on the received authentication information.

In accordance with another aspect of the present disclosure, a method of performing authentication by an electronic device including a communication circuit, a display, a memory, and a processor includes: identifying whether the electronic device is mounted on a first external electronic device; executing at least one application for an authentication based at least part of the identification; detecting a second external electronic device for transmitting authentication information related to the authentication; detecting a second external electronic device, which can transmit authentication information related to the authentication; receiving at least one piece of information related to the authentication from the second external electronic device based at least partially on the detection outcome; and performing the authentication based on the received authentication information.

Various embodiments of the present disclosure may provide an electronic device and a method for authentication, thereby performing more intuitive and convenient electronic payment and authentication and further improving convenience compared to the case in which the electronic device is mounted on the first external electronic device, into which it is inconvenient to perform input.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
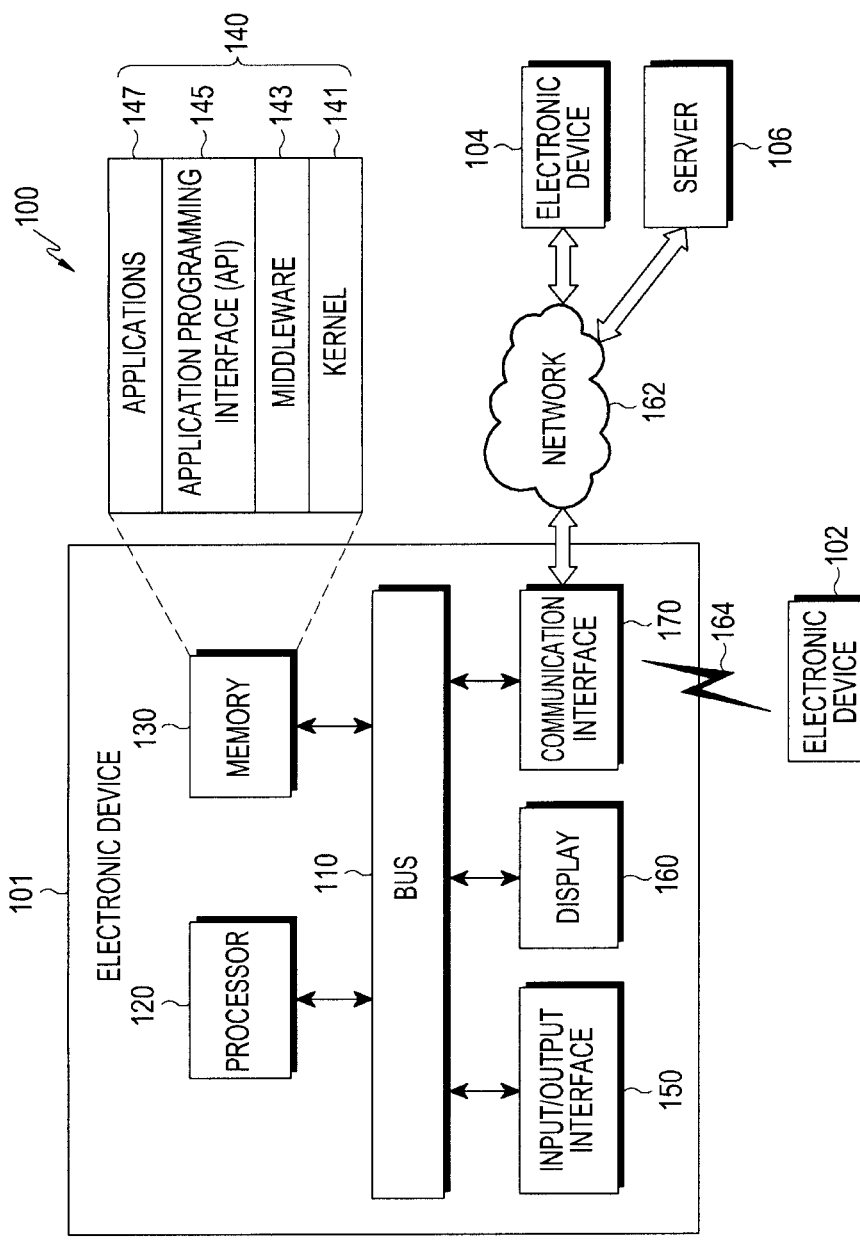
FIG. 1 illustrates an electronic device 101 within a network environment 100 according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 within a network environment 100 according to an embodiment of the present disclosure.

The electronic device 101 may include a bus 110, a processor 120, a memory 130, an input/output interface 150, a display 160, and a communication interface/circuit 170. In some embodiments, the electronic device 101 may omit at least one of the elements, or may further include other elements.

The bus 110 may include, for example, a circuit which interconnects the components 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or applications (or "apps") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the applications 147 may access the individual elements of the electronic device 101 to control or manage the system resources.

The middleware 143 may function as, for example, an intermediary for allowing the API 145 or the applications 147 to communicate with the kernel 141 to exchange data.

In addition, the middleware 143 may process one or more task requests received from the applications 147 according to priorities thereof. For example, the middleware 143 may assign priorities for using the system resources (for example, the bus 110, the processor 120, the memory 130, or the like) of the electronic device 101, to at least one of the applications 147. For example, the middleware 143 may perform scheduling or loading balancing on the one or more task requests by processing the one or more task requests according to the priorities assigned to the one or more applications.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) to the user. The display 160 may include a touch screen and may receive, for example, a touch, gesture, proximity, or hovering input made using an electronic pen or a part of a user's body.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short-range communication 164. The short-range communication 164 may include at least one of, for example, Wi-Fi, LiFi, Bluetooth, and Near Field Communication (NFC). The GNSS may include at least one of, for example, a Global Positioning System (GPS), a Global Navigation Satellite System (GLONASS), a BeiDou Navigation Satellite System (hereinafter referred to as "BeiDou"), and a European Global Satellite-based Navigation System (Galileo), according to a use area, a bandwidth, or the like. Hereinafter, in the present disclosure, the term "GPS" may be interchangeably used with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver information about the result of execution thereof to the electronic device 101. The electronic device 101 may process the received result as it is, or after performing additional processing thereon, to provide the requested function or service. To this end, for example, cloud-computing, distributed-computing, or client-server-computing technology may be used.

Figure 2:
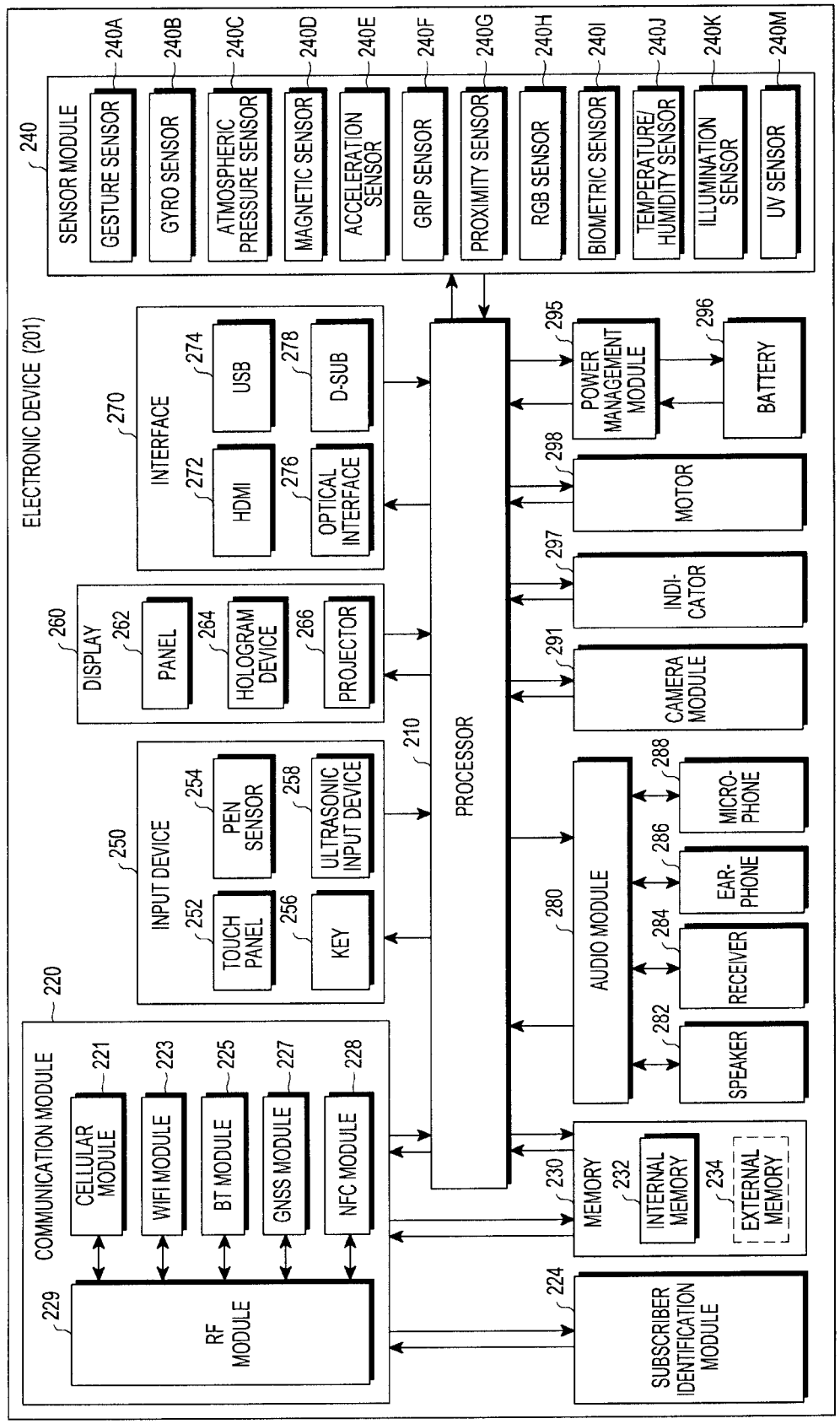
FIG. 2 is a block diagram of an electronic device 201 according to various embodiments.

FIG. 2 is a block diagram of an electronic device 201 according to an embodiment of the present disclosure.

The electronic device 201 may include, for example, the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application. The processor 210 may be implemented by, for example, a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in volatile memory, instructions or data received from at least one of the other elements (for example, non-volatile memory) to process the loaded instructions or data, and may store various types of data in the non-volatile memory.

The communication module 220 may have a configuration identical or similar to that of the communication interface 170 of FIG. 1. The communication module 220 may include, for example, a cellular module 221, a Wi-Fi module 223, a BT module 225, a GNSS module 227 (for example, a GPS module, a GLONASS module, a BeiDou module, or a Galileo module), an NFC module 228, and a Radio Frequency (RF) module 229.

The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid-State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through any of various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red, Green, and Blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may be at least one of, for example, a capacitive type, a resistive type, an infrared type, and an ultrasonic type. The touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 (for example, the display 160) may include a panel 262, a hologram device 264, or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using light interference. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) interface 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like.

The camera module 291 is a device that can photograph a still image and a dynamic image. According to an embodiment, the camera module 291 may include one or more image sensors (for example, a front sensor or a rear sensor), a lens, an Image Signal Processor (ISP), or a flash (for example, an LED, a xenon lamp, and the like).

The power management module 295 may manage, for example, the power of the electronic device 201. The electronic device 201 may be an electronic device receiving power through a battery, but is not limited thereto. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic-resonance method, a magnetic-induction method, an electromagnetic-wave method, and the like. Additional circuits (for example, a coil loop, a resonance circuit, a rectifier, and the like) for wireless charging may be further included. The battery gauge may measure, for example, a remaining charge of the battery 296, and a voltage, a current, or a temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted, or other additional elements may be further included in the electronic device. Also, some of the hardware components according to various embodiments may be combined into one entity, which may perform functions identical to those of the relevant components before the combination thereof.

Figure 3:
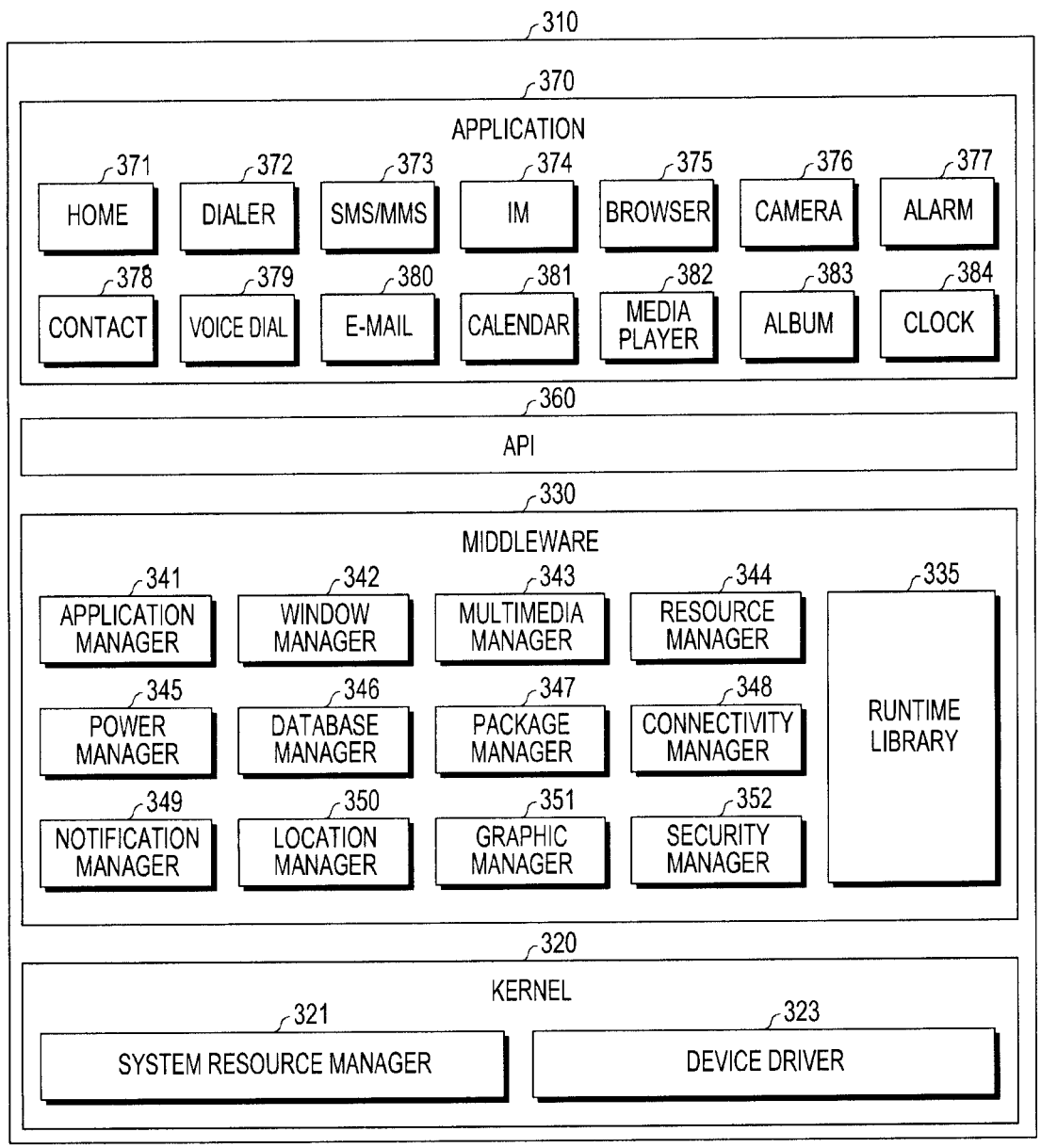
FIG. 3 is a block diagram of a program module according to various embodiments.

FIG. 3 is a block diagram of a program module according to an embodiment of the present disclosure.

According to the embodiment, the program module 310 (for example, the program 140) may include an Operating System (OS) that controls resources relating to an electronic device (for example, the electronic device 101) and/or various applications (for example, the applications 147) running on the operating system. The operating system may be, for example, Android™, iOS™, Windows™, Symbian™, Tizen™, Bada™, and the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use the limited system resources within the electronic device. According to an embodiment, the middleware (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, functionality for an arithmetic function, and the like.

The application manager 341 may manage, for example, the life cycle of at least one of the applications 370. The window manager 342 may manage GUI resources used for a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

For example, the power manager 345 may operate together with a Basic Input/Output System (BIOS) and the like, may manage a battery or power, and may provide power information and the like required for operation of the electronic device. The database manager 346 may generate, search, and/or update a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or provide notification of an event, such as an arrival message, an appointment, a proximity notification, and the like, in such a manner as to avoid disturbing a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to an embodiment, when the electronic device (for example, the electronic device 101) has a telephone call function, the middleware 330 may further include a telephony manager that manages a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some existing elements, or may add new elements.

The API 360 (for example, the API 145) is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 (for example, the applications 147) may include, for example, one or more applications that are capable of providing functions such as a home application 371, a dialer application 372, an SMS/MMS application 373, an Instant Message (IM) application 374, a browser application 375, a camera application 376, an alarm application 377, a contact application 378, a voice dial application 379, an email application 380, a calendar application 381, a media player application 382, an album application 383, a clock application 384, a health care application (for example, measuring exercise quantity or blood sugar), an environment information (for example, atmospheric pressure, humidity, or temperature information) provision application, and the like.

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server or the electronic device 102 or 104). According to an embodiment, the applications 370 may include a preloaded application or a third-party application that may be downloaded from a server. The names of the elements of the program module 310, according to the embodiment illustrated in the drawing, may vary depending on the operating system.

According to various embodiments, at least a part of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

Figure 4:
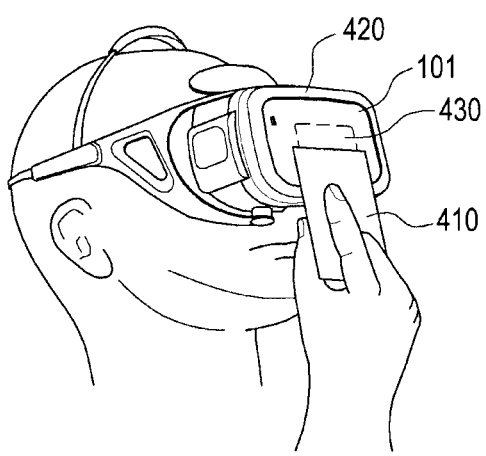
FIG. 4 illustrates an example in which a user wearing a first external electronic device brings a second external electronic device close to an electronic device in the state in which the electronic device is mounted on the first external electronic device according to various embodiments of the present disclosure.

FIG. 4 illustrates an example in which a user wearing a first external electronic device brings a second external electronic device close to an electronic device in the state in which the electronic device is mounted on the first external electronic device according to an embodiment of the present disclosure.

As shown in FIG. 4, the electronic device 101 (for example, the electronic device 101 of FIG. 1 or the electronic device 201 of FIG. 2) can be attached to/detached from a first external electronic device 420 (for example, an HMD), which can be mounted on the user's head. The first external electronic device 420 may be designed to allow the electronic device 101 to be attached thereto/detached therefrom.

According to various embodiments of the present disclosure, the first external electronic device 420 may be a mechanical structure that can mount the electronic device 101 to be attached thereto/detached therefrom. The first external electronic device 420, such as a head set having no communication function, may be strapped to user's head, or may be equipped to provide a communication function with the electronic device 101. When the electronic device 101 is mounted on the first external electronic device 420, i.e., headset, can be configured to mount the electronic device 101. For example, once the electronic device is docked, a spring-loaded clasp on the opposite end of the headset can lock the electronic device into place.

According to various embodiments of the present disclosure, the first external electronic device 420 may include lenses at locations respectively corresponding to the two eyes of the wearer. The electronic device may render a pair of images, side by side, when you look through these lenses, thereby tricking one's brain into merging the pair images into a single image. Thus, in operation, the wearer can view the screen of the display of the electronic device 101 through the lenses in the state in which the electronic device 101 is mounted on the first external electronic device 420.

According to various embodiments of the present disclosure, the first external electronic device 420 may further include an input device such as a touch panel, a button, a wheel key, and a touch pad. When the electronic device 101 is mounted, the first external electronic device 420 may be connected through an interface such as a USB interface and communicate with the electronic device 101.

In response to an input received from the first external electronic device 420, the electronic device 101 according to various embodiments of the present disclosure may control many different functions corresponding to the input. For example, the electronic device 101 may control a volume or control (for example, output) an image in a dual mode (for example, a Head-Mounted Theater (HMT) mode) in response to the received input.

The electronic device 101 according to various embodiments of the present disclosure may reproduce an image received from the server 106 or an image stored in the memory 130. The electronic device 101 may generate a three-dimensional image by converting an image in a single mode (for example, a two-dimensional image) into an image in a dual mode (for example, a three-dimensional image) and reproduce the generated three-dimensional image.

The electronic device 101 according to various embodiments of the present disclosure may include a communication module (for example, an NFC module 430). The electronic device 101 may detect the proximity of at least one second external electronic device 410 (for example, a card including NFC, a payment card including NFC, a sticker including NFC, or an external electronic device including NFC) through the NFC module 430. The electronic device 101 may execute the NFC module 430 in a reader mode in order to detect the proximity of the second external electronic device to be authenticated.

Figure 5:
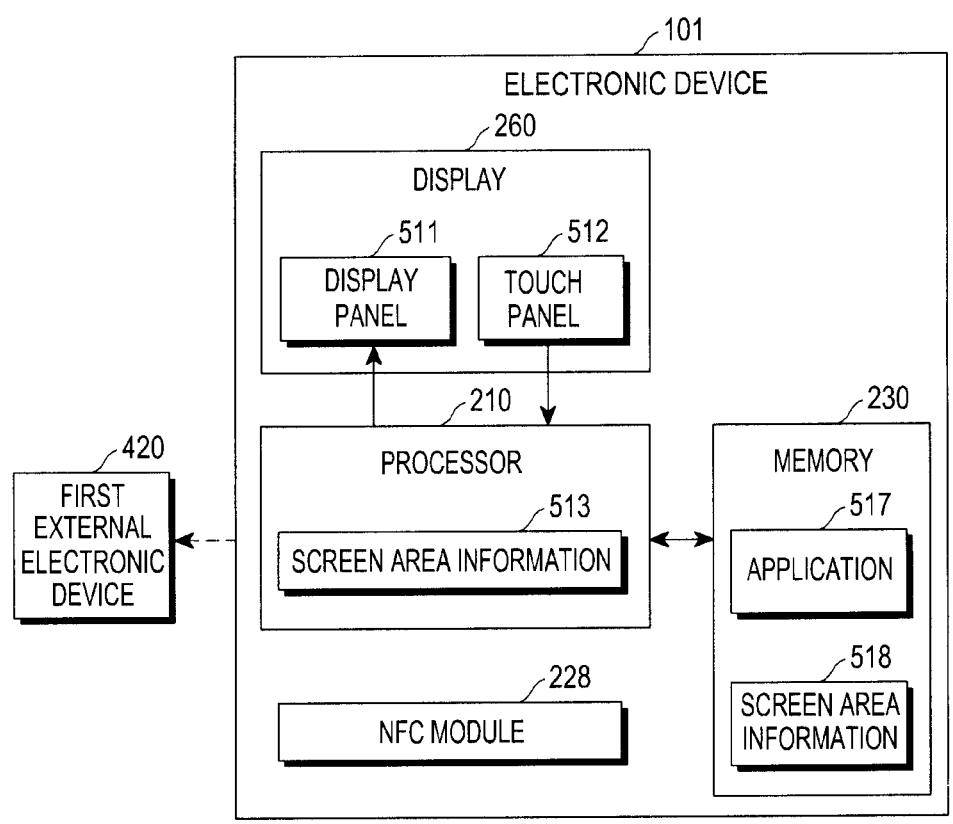
FIG. 5 is a block diagram illustrating in detail the electronic device that can be attached to/detached from the first external electronic device according to various embodiments of the present disclosure.

FIG. 5 is a block diagram illustrating in detail an electronic device that can be attached to/detached from the first external electronic device according to various embodiments of the present disclosure.

Referring to FIG. 5, the electronic device 101 (for example, the electronic device 101 of FIG. 1, the electronic device 201 of FIG. 2, or the electronic device 101 of FIG. 4) that can be attached to/detached from the first external electronic device according to various embodiments of the present disclosure may include at least one display 260. The electronic device 101 may be, for example, a device having a display function as a main function or a general electronic device including at least one display means.

According to various embodiments of the present disclosure, the electronic device 101 may include at least one of the display 260, the processor 220, the NFC module 228, and the memory 230. The display 260 may include a display panel 511 and/or a touch panel 512. The processor 220 may include an attachment/detachment determination unit 513.

According to various embodiments of the present disclosure, the processor 220 may execute an application including an authentication function, and, when at least one authentication means is registered in the executed application, store information on at least one registered authentication means in the memory 230 or transmit the information to the server (for example, the server 106 of FIG. 1). For example, the authentication function may include a method using biometric authentication (for example, fingerprint or iris) or a password.

According to various embodiments of the present disclosure, the attachment/detachment determination unit 513 may determine whether the electronic device 101 is mounted on the first external electronic device (for example, the first external electronic device 420 of FIG. 4 (HMD)). The electronic device 101 may change an operation mode or execute a relevant application based on the determination of whether the electronic device 101 is mounted on the first external electronic device. For example, when it is determined that the electronic device 101 is mounted on the first external electronic device, the electronic device 101 may transitioned to operate in a VR mode.

According to various embodiments of the present disclosure, the processor 220 may execute at least one application for authentication (for example, user authentication). The processor 220 may display, for example, a screen for authentication on the display. For example, the processor 220 may display a screen including at least one payment application (for example, Samsung Pay, Apple Pay, or Kakao Pay) for electronic payment through the display, and, when the displayed payment application (for example, Samsung Pay) is selected, display a screen for receiving authentication information for the authentication through the display.

According to various embodiments of the present disclosure, the processor 220 may detect the second external electronic device (for example, the second external electronic device 410 of FIG. 4), which can transmit authentication information related to the authentication. The processor 220 may receive at least one piece of information related to the authentication from the detected second external electronic device.

According to various embodiments of the present disclosure, the processor 220 may perform an authentication operation based on at least one piece of received information related to the authentication. For example, the processor 220 may identify whether at least one piece of received information related to the authentication is associated with at least one piece of information related to authentication stored in the electronic device. For example, when the received authentication information is a credit card number and the credit card number exists in the information registered for authentication stored in the memory, the processor 220 may perform the authentication operation. For example, the processor 220 may transmit at least some pieces of information related to the authentication to the server 106 and receive an authentication result from the server 106 so as to authenticate the user.

According to various embodiments of the present disclosure, the processor 220 may execute the NFC module 228 in a reader mode. When the NFC module 228 is executed and the second external electronic device is detected through the executed NFC module 228, the processor 220 may determine whether at least some pieces of authentication information received from the detected second external electronic device are registered for the authentication. For example, when at least some pieces of authentication information received from the detected second external electronic device are registered, the processor 220 may execute the selected payment application. The processor 220 may display a list of registered payment cards on the executed payment application and process the electronic payment through the payment card selected from the displayed list.

According to various embodiments of the present disclosure, the location or size of an image output in the dual mode through the display panel 511 of the electronic device 101 may be controlled to fit the user wearing the first external electronic device 420. For example, when the electronic device 101 is mounted on the first external electronic device 420 and operates in the dual mode (for example, HMT mode), the electronic device 101 may display a dual-mode (for example, HMT mode) image displayed through the display panel 511 as two images corresponding to user's left eye and right eye.

According to various embodiments of the present disclosure, the NFC module 228 may operate in the reader mode and detect the second external electronic device including an NFC function (for example, a card including NFC, a credit card including NFC, or a wearable electronic device including NFC). The electronic device 101 may receive at least some pieces of authentication information related to authentication from the second external electronic device including the NFC function through the NFC module 228.

The memory 230 according to various embodiments of the present disclosure may store at least one application 517. The application 517 may include an application related to dual-mode operation of the electronic device 101 or at least one payment application related to electronic payment (for example, Samsung Pay, Apple Pay, or Kakao Pay). The application 517 may include, for example, at least one application for registering the second external electronic device to be applied to the electronic payment.

According to various embodiments of the present disclosure, the first external electronic device 420 may be a certain electronic device including at least one function of the electronic device 101 illustrated in FIG. 1 or a wearable holder that may simply hold the electronic device 101.

According to various embodiments of the present disclosure, if the mounting of the electronic device 101 cannot be independently determined when the electronic device 101 is mounted on the first external electronic device 420, the user may execute the application 517 or select the dual mode.

At least some functions of the processor 220 illustrated in FIG. 5 may be included in the display 160 or the processor 120 of the electronic device 101 illustrated in FIG. 1. The display 260 or the display panel 511 illustrated in FIG. 5 may correspond to the display 160 of FIG. 1. The memory 230 illustrated in FIG. 5 may correspond to the memory 130 illustrated in FIG. 1.

Although FIG. 5 illustrates the display panel 511 and the touch panel 512 as the display 260, the display panel 511 and the touch panel 512 may be included in the form of separated panels instead of the form of one display 260 according to various embodiments.

According to various embodiments of the present disclosure, an electronic device may include: a communication circuit; a display; a memory; and at least one processor electrically connected to the communication circuit, the display, and the memory, wherein the memory may store instructions that cause the at least one processor to determine whether the electronic device is mounted on a first external electronic device, execute at least one application for authentication based at least partially on the determination outcome, detect a second external electronic device, which can transmit authentication information related to the authentication, receive at least one piece of information related to the authentication from the second external electronic device based at least partially on the detection outcome, and perform the authentication based on the received authentication information.

According to an embodiment, the instructions may cause the at least one processor to determine whether the second external electronic device can transmit authentication information and receive the authentication information from the second external electronic device based on the determination of whether the second external electronic device can transmit the authentication information.

According to an embodiment, the instructions may cause the at least one processor to set the state of the communication circuit as the state in which the communication circuit can receive at least one piece of information from the outside based on the determination of whether the electronic device is mounted on the first external electronic device.

According to an embodiment, the communication circuit may include Near-Field Communication (NFC).

According to an embodiment, the instructions may cause the at least one processor to determine whether the detected second external electronic device has been registered for authentication based on the at least one piece of information received through the communication circuit.

According to an embodiment, the instructions may cause the at least one processor to make a request for authentication by transmitting information on the detected second external electronic device to a server, receive a response from the server in response to the request, and determine whether the detected second external electronic device has been registered based on the received response.

According to an embodiment, the instructions may cause the at least one processor to perform electronic payment when the detected second external electronic device has been registered.

According to an embodiment, the second external electronic device may transmit information required for authentication to the electronic device and include at least one of a card having the NFC function, a payment card having the NFC function, a sticker having the NFC function, and an electronic device capable of performing short-range communication with the electronic device.

According to an embodiment, the instructions may cause the at least one processor to output a message prompting for the second external electronic device for the authentication to be brought close to the electronic device through at least one of a voice and a popup window.

According to an embodiment, the instructions may cause the at least one processor to divide an area of the display into a first area and a second area, display an image acquired through a camera of the electronic device in the first area, and display an execution screen of the application in the second area.

Figure 6:
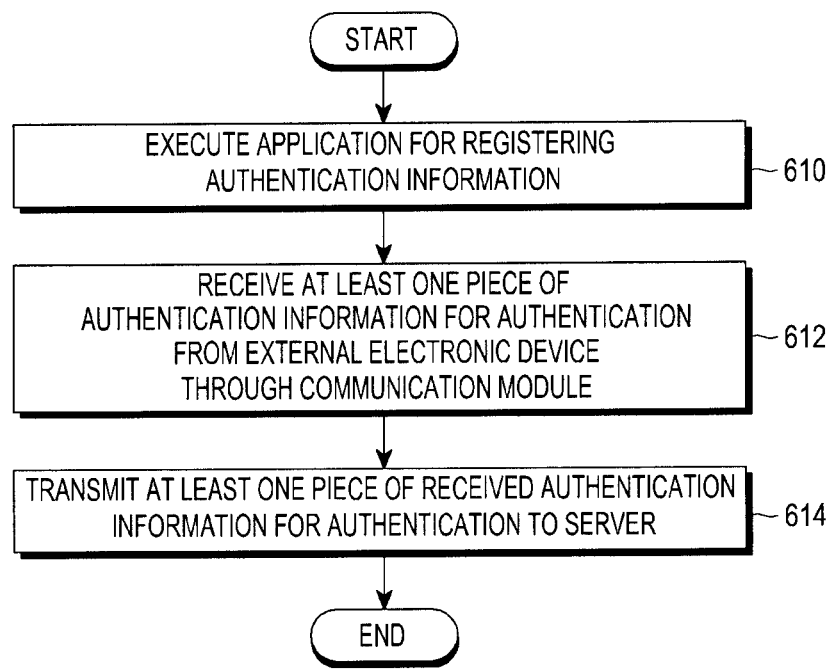
FIG. 6 is a flowchart illustrating the operation of transmitting authentication information for authentication to the server according to an embodiment of the present disclosure.

FIG. 6 is a flowchart illustrating the operation of transmitting authentication information for authentication to the server according to an embodiment of the present disclosure.

Hereinafter, the operation of transmitting authentication information for authentication to the server according to an embodiment of the present disclosure will be described below with reference to FIG. 6.

In operation 610, the processor of the electronic device (for example, the electronic device 101 of FIG. 1, the electronic device 201 of FIG. 2, the electronic device 101 of FIG. 4, or the electronic device 101 of FIG. 5) may execute an application for registering authentication information. For example, the processor of the electronic device may display the application for registering the authentication information for user authentication on the display in response to a user's input.

In operation 612, the processor of the electronic device may receive at least one piece of authentication information for authentication from an external electronic device through a communication module. For example, the processor of the electronic device may receive authentication information for authentication (for example, a card number, a unique number, or an identifier) from an external electronic device (for example, the second external electronic device 410 of FIG. 4, a card having an NFC function, a payment card having an NFC function, a sticker having an NFC function, and an external electronic device capable of performing short-range communication with the electronic device) through an NFC module.

In operation 614, the processor of the electronic device may transmit at least one piece of received authentication information for authentication to a server (for example, the server 106 of FIG. 1). The server may register at least one piece of authentication information for authentication received from the electronic device as information for authenticating the user. The electronic device may receive a response indicating the registration of the authentication information from the server in response to the transmission of the authentication information for authentication. At least one operation performed in operations 610 to 614 may be performed before electronic payment is executed. According to an embodiment, the authentication information for authentication may be stored in the server or the electronic device.

Figure 7:
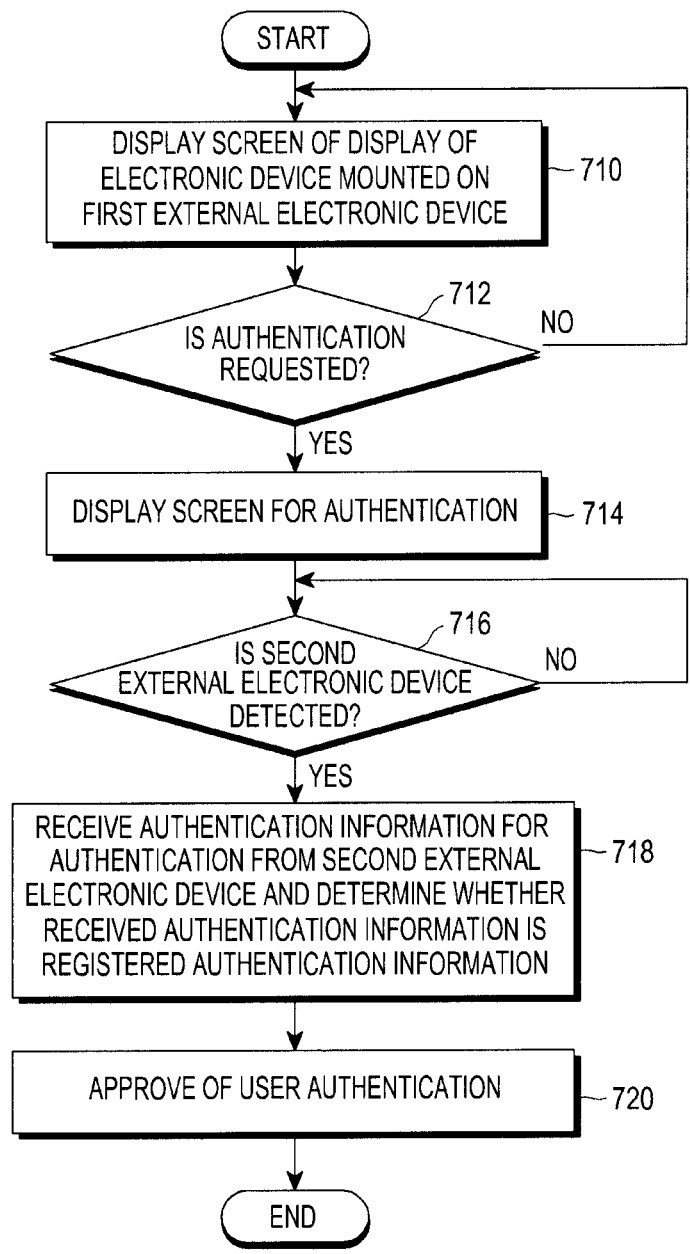
FIG. 7 is a flowchart illustrating an operation in which the electronic device performs authentication according to another embodiment of the present disclosure.

FIG. 7 is a flowchart illustrating an operation in which the electronic device performs authentication according to another embodiment of the present disclosure.

Hereinafter, referring to FIG. 7, the processor of the electronic device (for example, the electronic device 101 of FIG. 1, the electronic device 201 of FIG. 2, the electronic device 101 of FIG. 4, or the electronic device 101 of FIG. 5) mounted on the first external electronic device (for example, the first external electronic device 420 of FIG. 4) may display a screen of the display of the electronic device in operation 710. For example, the user wearing the first external electronic device (for example, an HMD), on which the electronic device is mounted, may see the displayed screen.

In operation 712, the processor of the electronic device 101 may determine whether authentication is requested. For example, when the user wearing the first external electronic device performs electronic payment, the processor of the electronic device may determine that authentication is requested.

In operation 714, the processor of the electronic device may display a screen for authentication. The electronic device may operate an NFC module (for example, the NFC module 228 of FIG. 5) in a reader mode.

In operation 716, the processor of the electronic device may detect a second external electronic device. According to an embodiment, the processor of the electronic device may output a message instructing to bring the second external electronic device for authentication close to the electronic device. The processor of the electronic device may output a message including information instructing to bring the second external electronic device close to the electronic device through at least one of a voice signal and a popup window in order to allow the user to recognize the proximity of the second external electronic device for authentication. According to an embodiment, the processor of the electronic device may divide an area of the display into a first area and a second area in order to allow the user wearing the first external electronic device to find the second external electronic device. The processor of the electronic device may divide the area of the display into the first area and the second area to allow the user to find the second external electronic device, display an image acquired through a camera of the electronic device in the first area, and display an application in the second area. The application displayed in the second area receives an addition information from the user regarding an authentication process.

The second external electronic device may transmit information for authentication to the electronic device. For example, the second external electronic device may include at least one of a card having an NFC module, a payment card having an NFC module, a sticker having an NFC module, and an external electronic device capable of performing short-range communication with the electronic device (for example, the first external electronic device 102 of FIG. 1 or the second external electronic device 410 of FIG. 4).

In operation 718, the processor of the electronic device may receive authentication information for authentication from the detected second external electronic device. The processor of the electronic device may perform the authentication operation based on at least some pieces of the received authentication information. For example, the processor of the electronic device may identify whether the received information is registered information for authentication by comparing the received information with authentication information stored in the memory (for example, the memory 130 of FIG. 1, the memory 230 of FIG. 2, or the memory 230 of FIG. 5). For example, the electronic device may transmit at least some pieces of the received authentication information to the server (for example, the server 106 of FIG. 1). The electronic device may receive a response to the transmitted information and determine whether the received authentication information has been registered for authentication. The response may include information indicating whether the second external electronic device has been registered or not.

In operation 720, the processor of the electronic device may determine that at least some pieces of the authentication information received from the second external electronic device are authentication information registered for authentication. The processor of the electronic device may determine whether information on the second external electronic device has been registered or not through the received response to the transmitted information on the second external electronic device. For example, when the information on the second external electronic device is registered, the processor of the electronic device may approve the authentication. For example, when the information on the second external electronic device is not registered, the processor of the electronic device may not approve the authentication.

Figure 8:
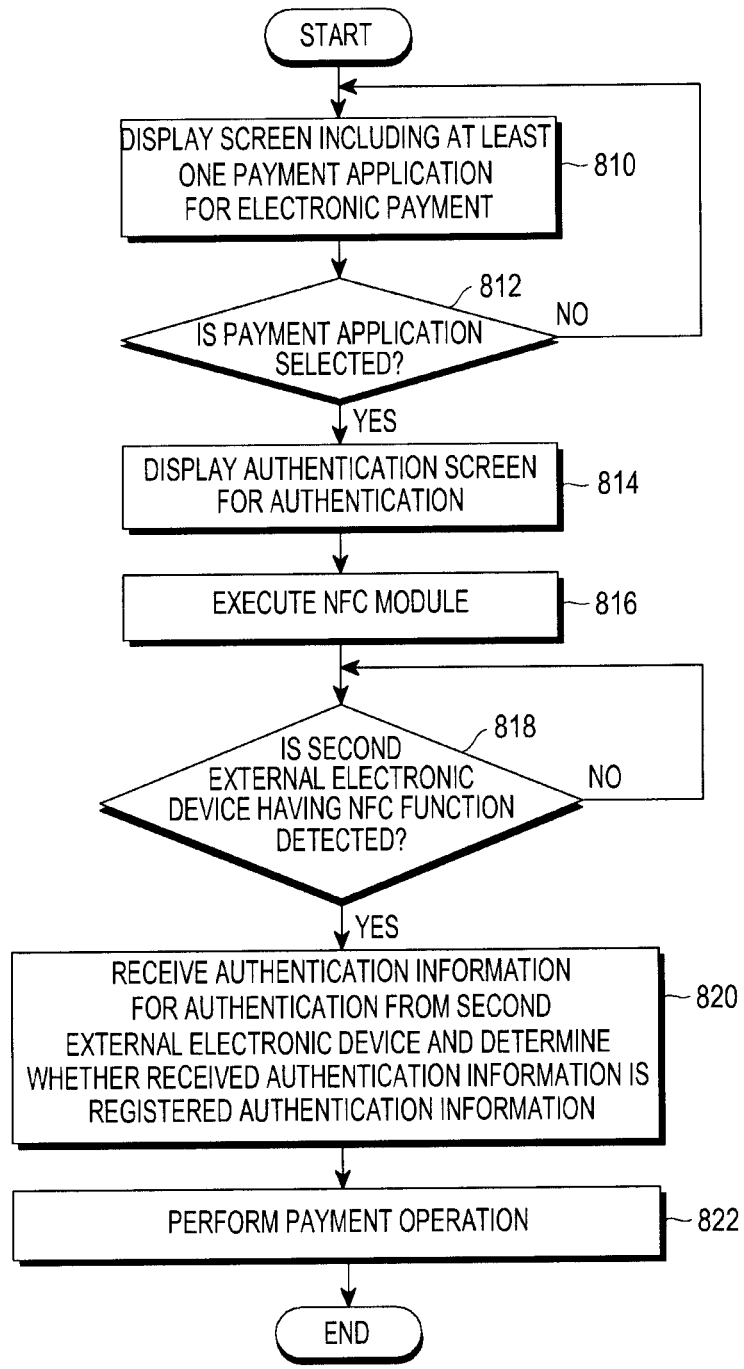
FIG. 8 is a flowchart illustrating an operation in which the electronic device processes electronic payment according to an embodiment of the present disclosure.

FIG. 8 is a flowchart illustrating an operation in which the electronic device processes electronic payment according to an embodiment of the present disclosure.

Hereinafter, an operation in which the electronic device mounted on the first external electronic device processes electronic payment through the second external electronic device including an NFC module will be described below in detail with reference to FIG. 8.

In operation 810, the process of the electronic device (for example, the electronic device 101 of FIG. 1, the electronic device 201 of FIG. 2, the electronic device 101 of FIG. 4, or the electronic device 101 of FIG. 5) may display a screen including at least one payment application for electronic payment. The processor of the electronic device mounted on the first external electronic device (for example, the first external electronic device 420 of FIG. 4) may display a screen including a list of at least one payment application (for example, Samsung Pay, Apple Pay, or Kakao Pay) that may provide an electronic payment service through the display. The processor of the electronic device may determine that the payment application selected from the list is a payment application for performing electronic payment. For example, when it is determined that the application is a payment application, electronic payment to be performed later may be continuously executed through the determined payment application. Alternatively, the processor of the electronic device may display the list of at least one payment application whenever electronic payment is performed and allow the user to select a payment application.

In operation 812, the processor of the electronic device may determine whether the payment application is selected. The processor of the electronic device may determine that one payment application is selected by the user from the displayed list.

In operation 814, the processor of the electronic device may display an authentication screen for authentication.

In operation 816, the processor the electronic device may execute the NFC module (for example, the NFC module 228 of FIG. 2, the NFC module 430 of FIG. 4, or the NFC module 228 of FIG. 5). The processor of the electronic device may execute the NFC module in order to detect the second external electronic device having an NFC function (for example, the first external electronic device 102 of FIG. 1 or the second external electronic device 410 of FIG. 4). The processor of the electronic device may switch the NFC module to a reader mode. For example, the processor of the electronic device 101 may switch the NFC module to the reader module to receive authentication information from the second external electronic device.

In operation 818, the processor of the electronic device may detect the second external electronic device having the NFC function (for example, a card, a credit card, a point card, a sticker, or at least one external electronic device). For example, the electronic device 101 may detect at least one second external electronic device by switching the NFC module to the reader mode.

In operation 820, the processor of the electronic device may receive authentication information for authentication from the second external electronic device through the NFC module and determine whether the received authentication information is registered authentication information. The electronic device 101 (for example, the processor 210) may determine whether at least some pieces of authentication information for authentication received from the second external electronic device have been registered for authentication.

When at least some pieces of authentication information for authentication received from the second external electronic device have been registered, the processor of the electronic device may execute a payment operation in operation 822. For example, the user may select Samsung pay in operation 812, and the processor of the electronic device may receive authentication information for authentication received from the second external electronic device (for example, Gear S), and, when at least some pieces of the authentication information have been registered, may execute the payment operation through Samsung Pay. According to an embodiment, in order to transmit the authentication information to the electronic device, the second external electronic device may execute an application that can be linked with the payment application selected in operation 812. For example, the processor of the electronic device may receive information to be used for authentication, such as a credit card number, through the second external electronic device, and, when the credit card is a card registered in Samsung Pay, perform payment using the credit card.

According to various embodiments of the present disclosure, a method of performing authentication by an electronic device including a communication circuit, a display, a memory, and a processor may include: an operation of determining whether the electronic device is mounted on a first external electronic device; an operation of executing at least one application for authentication based at least partially on the determination; an operation of detecting a second external electronic device, which can transmit authentication information related to the authentication; an operation of receiving at least one piece of information related to the authentication from the second external electronic device based at least partially on the detection; and an operation of performing the authentication based on the received authentication information.

According to an embodiment of the present disclosure, the method may further include an operation of determining whether the second external electronic device can transmit authentication information and an operation of receiving the authentication information from the second external electronic device based on the determination of whether the second external electronic device can transmit the authentication information.

According to an embodiment, the method may further include an operation of setting the state of the communication circuit as a state in which the communication circuit can receive at least one piece of information from the outside based on the determination of whether the electronic device is mounted on the first external electronic device.

According to an embodiment, the operation of detecting the second external electronic device may include an operation of detecting the second external electronic device through a Near-Field Communication (NFC) module included in the communication circuit.

According to an embodiment of the present disclosure, the method may further include an operation of, when the second external electronic device is detected, determining whether the detected second external electronic device has been registered for the authentication based on the at least one piece of information received through the communication circuit.

According to an embodiment of the present disclosure, the method may further include an operation of making a request for authentication by transmitting information on the detected second external electronic device to a server; an operation of receiving a response from the server in response to the request; and an operation of determining whether the detected second external electronic device has been registered based on the received response.

According to an embodiment of the present disclosure, the method may further include an operation of, when the detected second external electronic device is registered, processing electronic payment.

According to an embodiment of the present disclosure, the second external electronic device may transmit information required for authentication to the electronic device and include at least one of a card having the NFC function, a payment card having the NFC function, a sticker having the NFC function, and an electronic device capable of performing short-range communication with the electronic device.

According to an embodiment of the present disclosure, the method may further include an operation of outputting a message prompting the second external electronic device for authentication to be brought close to the electronic device, wherein the message may be output through at least one of a voice and a popup window.

According to an embodiment of the present disclosure, in order to allow a user wearing the first external electronic device to find the second external electronic device, the method may further include an operation of dividing an area of the display into a first area and a second area; an operation of displaying an image acquired through a camera of the electronic device in the first area; and an operation of displaying an execution screen of the application in the second area.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. According to various embodiments, a storage medium storing instructions is provided. In a method of performing authentication by an electronic device including a communication circuit, a display, a memory, and a processor, the instructions may include a first instruction set that determines whether the electronic device is mounted on a first external electronic device; a second instruction set that executes at least one application for authentication based at least partially on the determination; an operation of detecting a second external electronic device capable of transmitting authentication information related to the authentication; a third instruction set that receives at least one piece of information related to the authentication from the second external electronic device based at least partially on the detection; a fourth instruction set that stores instructions performing the authentication based on the received authentication information.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device comprising:
 a communication circuit;
 a display;
 at least one processor operatively coupled to the communication circuit and the display; and
 a memory configured to store a plurality of instructions that cause the at least one processor configured to:
 identify whether the electronic device is mounted on a first external electronic device,
 based on receiving a request for executing a payment application in a state that the electronic device is mounted on the first external electronic device, display a preview image obtained through a camera of the electronic device on a first region of the display, and display a three-dimensional (3D) image including an execution screen of the payment application on a second region of the display, detect a presence of a second external electronic device close to the electronic device,
receive authentication information related to an authentication for the payment application from the second external electronic device based at least partially on the detection, and
perform the authentication based on the received authentication information.

2. The electronic device of claim 1, wherein the instructions cause the at least one processor to identify whether the second external electronic device can transmit the authentication information and receive the authentication information from the second external electronic device based on the identification that the second external electronic device can transmit the authentication information.

3. The electronic device of claim 1, wherein the instructions cause the at least one processor to set a state of the communication circuit as a state in which the communication circuit can receive at least one piece of information based on the identification that the electronic device is mounted on the first external electronic device.

4. The electronic device of claim 1, wherein the communication circuit includes Near-Field Communication (NFC).

5. The electronic device of claim 1, wherein the instructions cause the at least one processor to identify whether the detected second external electronic device has been registered for the authentication based on the authentication information received through the communication circuit.

6. The electronic device of claim 1, wherein the instructions cause the at least one processor to make a request for authentication by transmitting information related to the detected second external electronic device to a server, receive a response from the server in response to the request, and identify whether the detected second external electronic device has been registered based on the received response.

7. The electronic device of claim 6, wherein the instructions cause the at least one processor to perform an electronic payment based on identifying that the detected second external electronic device has been registered.

8. The electronic device of claim 1, wherein the second external electronic device comprises at least one of a card having Near-Field Communication (NFC) function, a payment card having the NFC function, a sticker having the NFC function, or an electronic device for performing short-range communication with the electronic device.

9. The electronic device of claim 1, wherein the instructions cause the at least one processor to output a message instructing to bring the second external electronic device for the authentication close to the electronic device, the message including at least one of a voice or a popup window.

10. A method of performing authentication by an electronic device having a communication circuit, a display, a memory, and a processor, the method comprising:
identifying whether the electronic device is mounted on a first external electronic device;
based on receiving a request for executing a payment application in a state that the electronic device is mounted on the first external electronic device, displaying a preview image obtained through a camera of the electronic device on a first region of the display, and displaying a three-dimensional (3D) image including an execution screen of the payment application on a second region of the display;
detecting a presence of a second external electronic device close to the electronic device,
receiving authentication information related to an authentication for the payment application from the second external electronic device based at least partially on the detection; and
performing the authentication based on the received authentication information.

11. The method of claim 10, further comprising:
identifying whether the second external electronic device can transmit the authentication information; and
receiving the authentication information from the second external electronic device based on the identification that the second external electronic device can transmit the authentication information.

12. The method of claim 10, further comprising setting a state of the communication circuit as a state in which the communication circuit can receive at least one piece of information based on the identification that the electronic device is mounted on the first external electronic device.

13. The method of claim 12, wherein the detecting of the second external electronic device comprises detecting the second external electronic device through a Near-Field Communication (NFC) module included in the communication circuit.

14. The method of claim 13, further comprising, when the second external electronic device is detected, identifying whether the detected second external electronic device has been registered for the authentication based on the authentication information received through the communication circuit.

15. The method of claim 13, further comprising:
making a request for authentication by transmitting information on the detected second external electronic device to a server;
receiving a response from the server in response to the request; and
identifying whether the detected second external electronic device has been registered based on the received response.

16. The method of claim 13, wherein the second external electronic device comprises at least one of a card having the NFC function, a payment card having the NFC function, a sticker having the NFC function, or an electronic device for performing short-range communication with the electronic device.

17. The method of claim 10, further comprising outputting a message instructing to bring the second external electronic device for the authentication close to the electronic device, the message including at least one of a voice or a popup window.

18. A non-transitory computer-readable storage medium storing a program having instructions for performing authentication in an electronic device including a communication circuit, a display, a memory, and a processor, the non-transitory computer-readable storage medium comprising:
identifying whether the electronic device is mounted on a first external electronic device;
based on receiving a request for executing a payment application in a state that the electronic device is mounted on the first external electronic device, displaying a preview image obtained through a camera of the electronic device on a first region of the display, and displaying a three-dimensional (3D) image including an execution screen of the payment application on a second region of the display;
detecting a presence of a second external electronic device close to the electronic device, receiving authentication information related to an authentication for the payment application from the second external electronic device based at least partially on the detection; and performing the authentication based on the received authentication information.

\* \* \* \* \*